US005464237A

United States Patent [19]
Saporiti

[11] Patent Number: 5,464,237
[45] Date of Patent: Nov. 7, 1995

[54] FOLDING CART

[76] Inventor: Elena H. Saporiti, Scalabrini Ortiz 2835 P.B. 1 (1425), Capital Federal, Argentina

[21] Appl. No.: 267,460

[22] Filed: Jun. 28, 1994

[51] Int. Cl.⁶ .................................. B62B 1/12; B60F 5/00
[52] U.S. Cl. ........................ 280/30; 280/11; 280/47.19; 280/47.26; 280/47.33; 280/652; 188/6
[58] Field of Search ................................ 280/7.12, 9, 11, 280/30, 37, 42, 43.1, 43.24, 47.19, 47.26, 47.33, 645, 646, 652; 52/165, 169.9; 188/6, 7

[56]  References Cited

U.S. PATENT DOCUMENTS

| | | | |
|---|---|---|---|
| D. 328,221 | 7/1992 | Piccarillo | 280/47.26 X |
| 1,468,682 | 9/1923 | Wallace | 280/11 |
| 2,472,203 | 6/1949 | Friedmann et al. | 280/652 |
| 2,564,939 | 8/1951 | Weast | 280/652 |
| 2,668,977 | 2/1954 | Reece | 280/47.19 X |
| 2,832,606 | 4/1958 | Patterson | 280/37 |
| 3,494,631 | 2/1970 | Kreider | 280/47.19 |
| 4,631,877 | 12/1986 | Molodecki | 280/30 X |
| 4,953,878 | 9/1990 | Sbragia | 280/30 |
| 5,100,198 | 3/1992 | Baltzell | 280/30 X |
| 5,269,157 | 12/1993 | Ciminelli et al. | 280/47.18 X |

FOREIGN PATENT DOCUMENTS 275911  8/1927  United Kingdom ................... 188/6

Primary Examiner—Brian L. Johnson
Attorney, Agent, or Firm—Brumbaugh, Graves, Donohue & Raymond

[57]  ABSTRACT

A folding cart can be unfolded from a flat, collapsed position to an open position. The cart has opposing front and back side walls which have ledges on their opposing faces, and opposing foldable walls hingedly secured to the front and back side walls. A bottom shelf is positioned on the ledges, and a top lid is positioned on top of the walls to form an inner storage cavity. The cart has wheel assemblies which are pivotally mounted to opposite sides of the back wall, and adjustable legs for firmly fixing or securing the cart to the ground. An umbrella pole passes through openings in the lid and the bottom shelf.

14 Claims, 2 Drawing Sheets

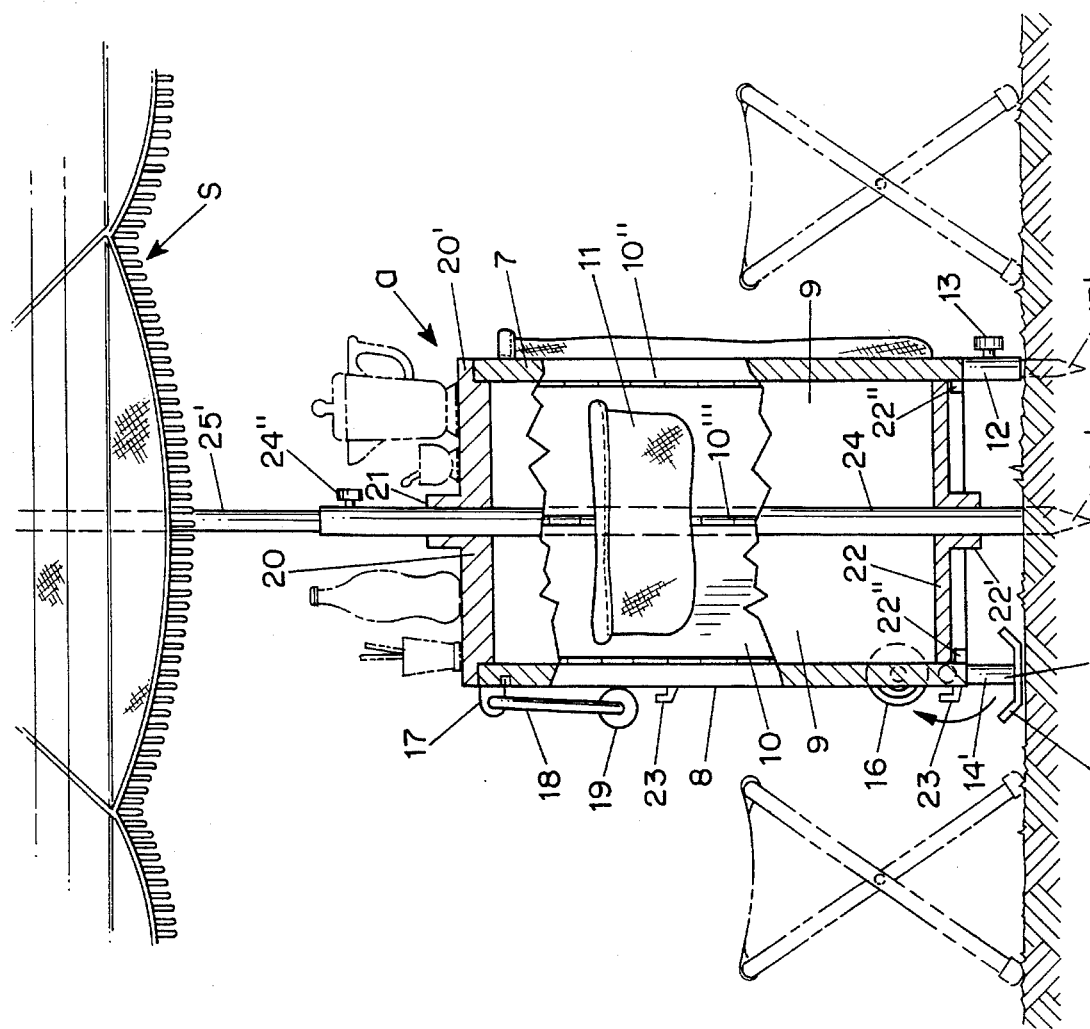
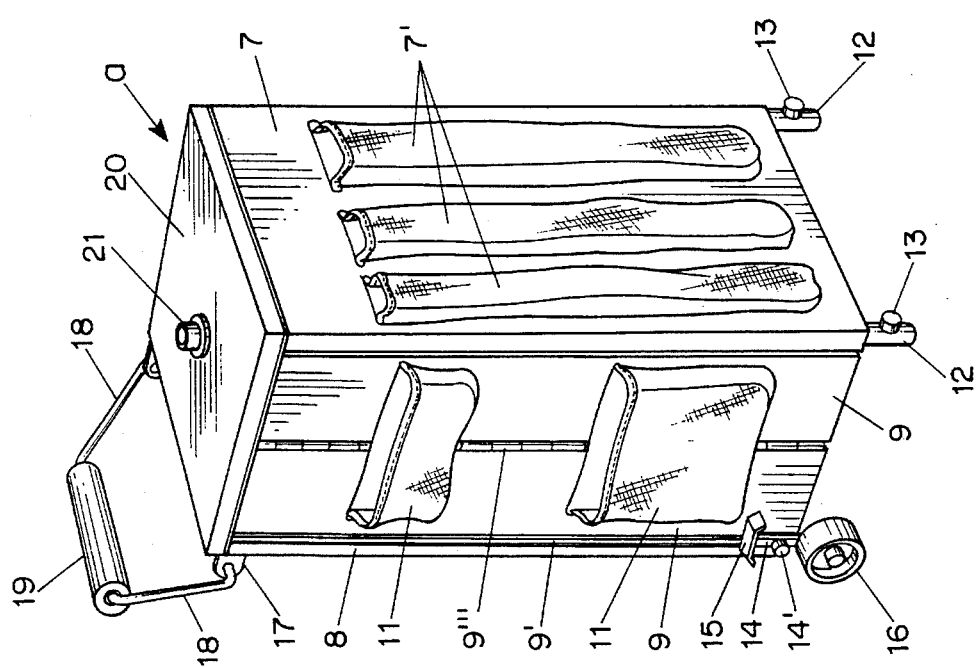

5,464,237

1
FOLDING CART

FIELD OF THE INVENTION

This invention relates to folding carts, e.g., for transporting camping equipment or beach gear.

BACKGROUND OF THE INVENTION

Today's world is very stressful. To escape from the stress, many people regularly leave the urban areas and visit more peaceful locations such as picnic grounds, woods and beaches. Although these people want to escape from the stresses of modern life, they do not want to leave all of modern life's conveniences behind. As a result, these people take many items along for the trip, such as beach umbrellas, folding chairs, thermoses, bottles, clothes, toys, magazines, books, food, dishes, cutlery, glasses, musical instruments, and the like.

Typically, these items are carried in a car or truck to the traveler's selected destination. A problem arises, however, when the car or truck can not be driven to the exact spot where the traveler wants to picnic, swim or engage in other recreational activities. As a result, the traveler must either leave some of the convenience items in the car or carry them all by hand to the final destination. Either alternative is undesirable.

Use of a folding cart can alleviate these difficulties in transporting desired items to a chosen destination such as, e.g., a spot on the beach or other outdoor destination.

Among devices which are somewhat similar to folding carts are shopping carts, golf carts, baby carriages with or without sunshades, portable tables, and the like. Often, several of such devices are used together, e.g., a portable table, a shopping cart and an umbrella stand. This is cumbersome, and portable tables are known to be unstable.

SUMMARY OF THE INVENTION

Aspects of the present invention include combined functions of transportation, of use as a firmly fixed dining table, and of reliable support for an umbrella even on gusty days. A further aspect is compactness so as to fit in the trunk of a car.

A preferred portable folding cart is designed to unfold from a flat collapsed position to an open position. The folding cart comprises four walls: a front side wall and a back side wall which oppose one another, and first and second foldable walls which also oppose one another and which are hingedly secured to the front and back side walls. The cart has a bottom shelf, a top lid, wheel-and-foot assemblies, and adjustment means.

BRIEF DESCRIPTION OF THE DRAWING

FIG. 4 is a perspective view of the inventive cart in an unfolded position; and

FIG. 5 is a side view of the inventive cart secured in a selected location.

Figure 3:
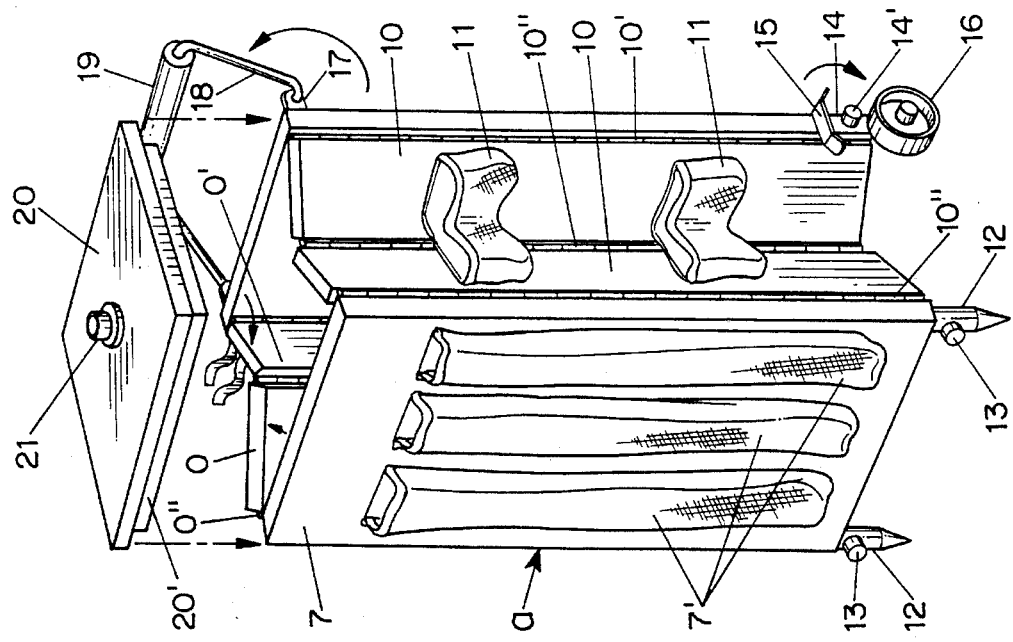
FIG. 3 is a perspective view of the inventive cart in a semi-folded position.

2
DETAILED DESCRIPTION OF PREFERRED EMBODIMENTS

Ledges are provided on the inside opposing faces of the front and back side walls of the cart, at the lower ends of the side walls. The bottom shelf is positioned at the bottom of the cart when the cart is unfolded. When in place, the bottom shelf sits on the ledges of the side walls, both to form an interior cavity in the cart and to add strength to the cart. The cart also has a lid which is placed on top of the four walls to form a table-like dining surface. Both the bottom shelf and the lid have openings in their centers. The volume enclosed by the four walls, the bottom shelf, and the lid can be used to store some of the items listed above.

The cart has pivotal wheel assemblies which are pivotally mounted to opposite sides of the back wall. The wheels make it easier for a user to move the cart. Each wheel assembly includes a wheel support pivot axle which has a wheel mounted at one end and a foot mounted at the other end. In a first position, the wheels are positioned below the bottom shelf when the user wants to move the cart. In a second position, the feet are positioned below the bottom shelf after the cart has arrived at the selected location in order to better secure the cart at that location. The wheel assembly also has a control which enables the axle to be rotated when the control is in a first position and secured in place when the control is in a second position.

The cart also includes first and second legs which are telescopically mounted to the lower end of the front wall. The legs extend from the bottom of the cart with the purpose of firmly fixing the cart to the ground at a selected location and also of adjusting the cart so the lid can be used as a dining table. Each leg has a sharpened end for facilitating placement of the leg in the ground and a knob for adjusting the length of the leg.

An umbrella is included, having a lower pole, an upper pole and an adjustment knob. The bottom end of the lower pole is sharpened so that it can be driven into the soil. To properly position the umbrella, the poles are passed through the openings in the lid and the bottom shelf. The height of the umbrella can then be adjusted, using the adjustment knob.

The external faces of the side walls and folding walls have pockets of varying sizes for storing items. Further, the back wall has a handle which is pivotally attached at the top end of the wall. The handle makes it easier for the user to move the cart. The external face of the back wall has holders which allow the user to secure the lid and bottom shelf for storage when the cart is folded.

A bag is included for storing the cart when the cart is in the folded position. The bag has a carrying strap and a hole for allowing the umbrella poles to be stored in a generally vertical position in the bag. The bag (b) is shown in FIG. 4, having a carrying strap 5 and a hole 1' for allowing a lower 24 and upper 25 umbrella pole to be stored in a generally vertical position.

Figure 2:
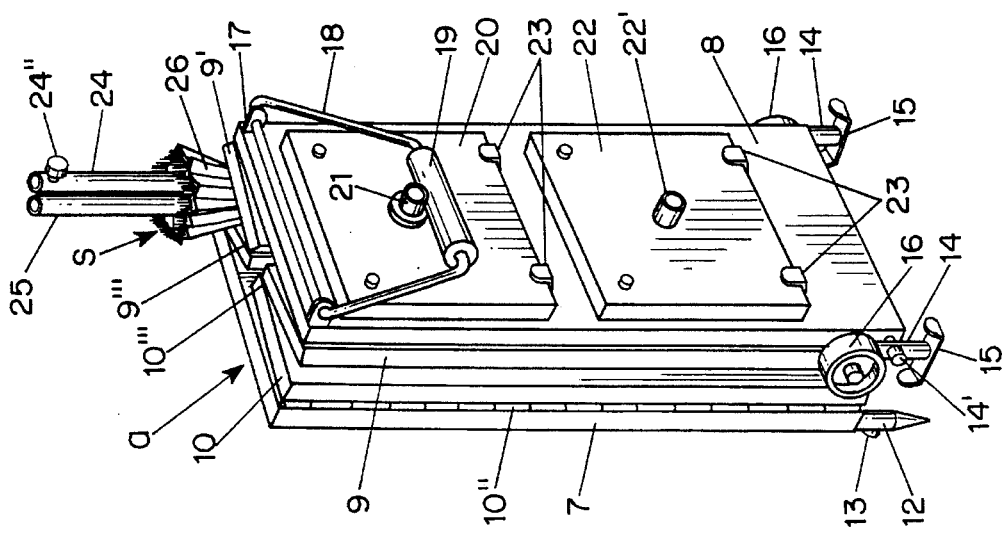
FIG. 2 is a perspective view of the inventive cart as it appears when stored in the bag.

Referring to FIGS. 2–4, the portable folding cart (a) is designed to unfold from a flat collapsed position, as shown in FIG. 2, to an open position, as shown in FIG. 4. The folding cart (a) comprises four walls 7, 8, 9 and 10. Inner faces of a front side wall 7 and a back side wall 8 oppose one another. Likewise, inner faces of a first foldable wall 9 and a second foldable wall 10, which are hingedly secured to the front and back side walls 7 and 8, also oppose one another. Each side wall 7 and 8 has formed on the lower end of its inner face a ledge 22".

After the walls 7, 8, 9 and 10 are unfolded, a bottom shelf 22 is positioned at the bottom of the cart. The bottom shelf 22 then sits on the ledges 22" of the side walls 7 and 8. The bottom shelf 22 adds strength to the cart. The cart also has a lid 20 which is placed on top of the four walls 7, 8, 9 and 10 to form a table-like surface for dining. Both the bottom shelf 22 and the lid 20 have respective openings 22' and 21 in their centers. The four walls 7, 8, 9 and 10, the bottom shelf 22, and the lid 20 enclose an internal volume which can be used to store some of the above-mentioned convenience items.

The cart has first and second wheel assemblies which are pivotally mounted to opposite sides of the back wall 8. Each wheel assembly includes a wheel support pivot axle 14 which has a wheel 16 mounted at one end and a foot 15 mounted at the other end. In a first position, the wheels 16 are positioned below the bottom shelf 22 when the user wants to move the cart. In a second position, the feet 15 are positioned below the bottom shelf 22 after the cart has arrived at the selected location in order to better secure the cart at that location. Each wheel assembly also has a control 14' which enables the axle 14 to be to rotated when the control is in a first position and secured in place when the control 14' is in a second position.

The cart also includes adjustable front legs 12 which are telescopically mounted to the lower end of the front wall 7. Each leg 12 has a sharpened end 13' for facilitating placement of the leg 12 into the ground and a knob 13 for adjusting the length of the leg 12. The legs 12 extend from the bottom of the cart with the purposes of securing or firmly fixing the cart to the ground at a selected location to prevent it from tipping over, and of adjusting the cart so the lid 20 can be used as a dining table.

The cart also includes an umbrella (s) having a lower pole 24, an upper pole 25 and an adjustment knob 24". The bottom end 24' of the lower pole 24 is sharpened so that it can be placed in the ground. To properly position the umbrella (s), the poles 24 and 25 are passed through the openings 21 and 22' in the lid 20 and the bottom shelf 22, respectively, and then the bottom end 24' of the lower pole 24 is driven into the ground. The height of the umbrella (s) can then be adjusted using the adjustment knob 24".

Other components may be included to advantage: The external faces of the side walls 7, 8 and folding walls 9, 10 have pockets 7', 11 of varying sizes for storing items. Further, the back wall 8 has a handle 19 which is pivotally attached at the top end of the back wall 8. The handle 19 makes it easier for the user to move the cart.

Referring to FIG. 2, the external face of the back wall 8 has holders 23 and 23' which allow the user to secure the lid 20 and bottom shelf 22 for storage, respectively.

Figure 1:
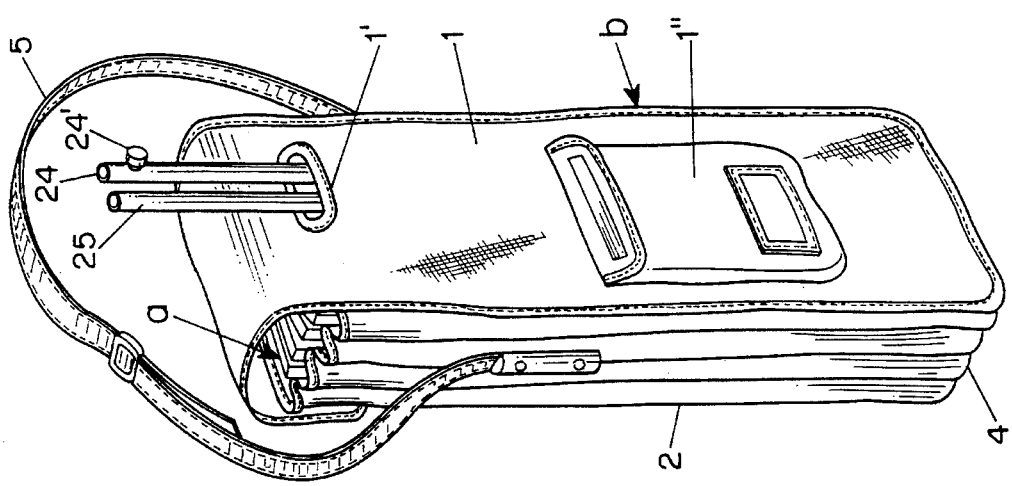
FIG. 1 is a perspective view of the inventive cart stored in a bag.

Referring to FIG. 1, in operation, the user removes the closed cart in its essentially flat position from the bag (b).

Referring to FIGS. 2–4, hinges 9', 9", 10' and 10" connect the foldable walls 9 and 10 to the front 7 and back 8 walls. The first folding wall 9 and the second folding wall 10 have respective hinges 9''' and 10''' in their centers so the folding walls 9 and 10 can be opened and closed.

Referring to FIG. 5, the bottom shelf 22 is placed on the ledges 22" formed at the lower ends of the side walls 7 and 8. Positioning of the bottom shelf 22 adds strength to the cart. Next, the lid 20 is positioned on top of the four walls 7, 8, 9 and 10. Placement of the lid 20 provides a dining surface and also adds strength to the cart structure.

Referring to FIGS. 3 and 5, for moving the cart, the user must place the first and second wheel assemblies in proper position. This is done by moving the control 14' to the first position, and then rotating the wheel support pivot axle 14 so that the respective wheels 16 are below the bottom shelf 22. Once the wheels 16 are properly positioned, they can then be locked in place by moving the control 14' to the second position. The cart is now ready to be loaded up, e.g., with items as mentioned above.

Referring to FIG. 3, the umbrella (s) can be stored in one of the external pockets 7'.

To move the cart, the handle 19 is pivotally rotated to a comfortable position and the cart is slightly rotated or tipped so that the weight of the cart is supported by the wheels 16. The cart can then be moved to a location on the beach, in the woods or to any other selected location.

Referring to FIGS. 4–5, once the selected location is reached, the wheel support pivot axles 14 are rotated to the second position in which the foot end 15 of each wheel assembly is located below the bottom shelf 22. The adjustable legs 12 can then be driven into the ground to firmly fix the cart in place. The distance the legs 12 are driven into the ground can be modified depending on the relative firmness of the ground. Once the legs 12 are firmly in the ground, the length of the legs 12 can be finely adjusted, with the knob 13.

Upper 25 and lower 24 umbrella poles are inserted through the holes 21 and 22' in the lid 20 and bottom shelf 22 and then driven into the ground. The height of the umbrella canvas 26 can be modified with an adjustment knob 24". The umbrella (s) provides the benefit of blocking dangerous solar rays.

It will be understood that the principles of this invention are not limited to the specific examples given herein by way of illustration, but are applicable per the claims and equivalents.

I claim:

1. A portable folding cart which is designed to unfold from a flat, collapsed position to an open position, the cart comprising:

opposing front and back side walls, each side wall having on an opposing face a holder formed at a lower end thereof;

opposing first and second foldable walls hingedly secured to the front and back side walls;

a bottom shelf, having an opening in the center thereof, for being positioned on top of the holder;

a top lid, having an opening in the center thereof, for being positioned on top of the walls;

wheel means for supporting the cart, comprising one or more pivotal assemblies connected to said cart, having a wheel and a foot; and adjustment means for firmly fixing the cart at a selected location.

2. The cart of claim 1, wherein the wheel means comprises:

first and second wheel assemblies pivotally mounted to opposite sides of the back wall, each assembly including:

a wheel support pivot axle having the wheel at one end and the foot at a second end; and means for securing the axle in place, wherein the assembly has a first position in which the wheel is positioned below the bottom shelf and a second position in which the foot is positioned below the bottom shelf.

3. The cart of claim 1, wherein the adjustment means comprises:

first and second legs telescopically mounted to the lower end of the front wall for firmly fixing the cart; and means for modifying the height of the legs.

4. The cart of claim 3, wherein the height modifying means is for supporting the lid in a substantially level position.

5. The cart of claim 4, the adjustment means further comprising:

an umbrella including a pole having a sharpened lower end, wherein the pole is passed through the lid opening and the bottom shelf opening.

6. The cart of claim 5, wherein the pole has means for modifying the height thereof.

7. The cart of claim 6, wherein the walls have external pockets.

8. The cart of claim 7, wherein at least one of the walls has a handle pivotally attached at the top end thereof.

9. The cart of claim 8, wherein the at least one of the walls is the back wall.

10. The cart of claim 9, wherein the back wall includes means for securing the lid and the bottom shelf.

11. The cart of claim 10, wherein the cart in the collapsed position is storable in a bag.

12. The cart of claim 11, wherein the bag includes a carrying handle.

13. A portable folding cart which is designed to unfold from a flat collapsed position to an open position, the cart comprising:

opposing front and back side walls, each side wall having a holder on a lower end of an opposing face;

opposing first and second foldable walls hingedly secured to the front and back side walls;

a bottom shelf, having an opening in the center thereof, for being positioned on top of the ledges;

a top lid, having an opening in the center thereof, for being positioned on top of the walls;

wheel means for supporting the cart, comprising:

first and second wheel assemblies pivotally mounted to opposite sides of the back wall, each assembly including:

a wheel support pivot axle having a wheel at one end and a foot at a second end; and means for securing the pivot axle in place, wherein the assembly has a first position in which the wheel is positioned below the bottom shelf, and a second position in which the foot is positioned below the bottom shelf; and adjustment means for firmly fixing the cart at a selected location, comprising:

first and second legs telescopically mounted to the lower end of the front wall for supporting the cart; and means for adjusting the height of the legs.

14. The cart of claim 13 further comprising:

an umbrella having a pole with a sharpened lower end; and means for modifying the height of the pole, wherein the pole is passed through the lid opening and the bottom shelf opening.

\* \* \* \* \*